United States Patent Office 3,681,222
Patented Aug. 1, 1972

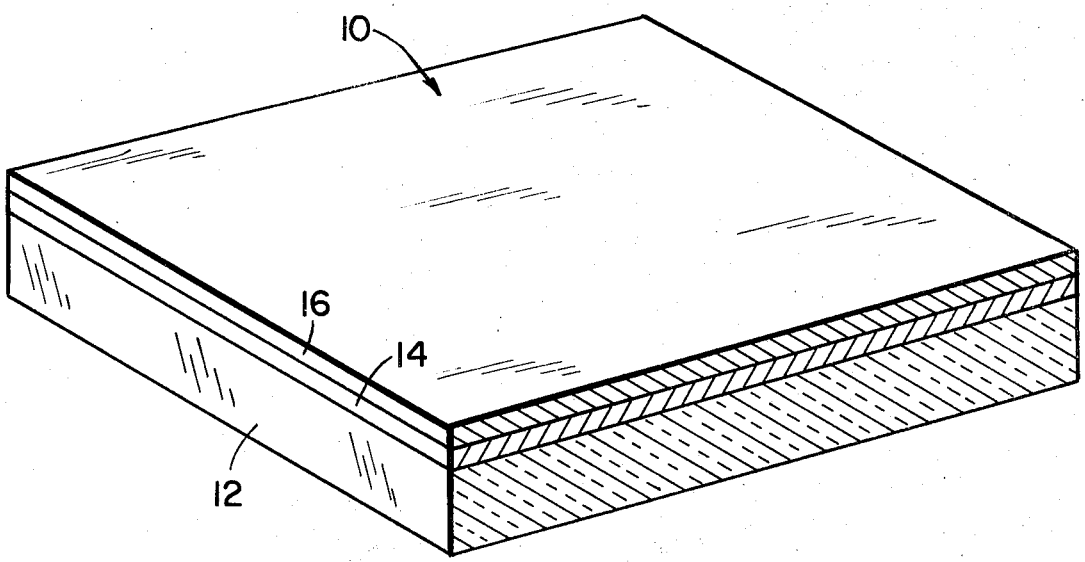

3,681,222
METHOD OF PRODUCING LUMINESCENT SCREENS BY THE ELECTROPHORETIC PROCESS
James A. Gupton, Jr., Raleigh, N.C., assignor to Corning Glass Works, Corning, N.Y.
Filed May 18, 1970, Ser. No. 38,296
Int. Cl. B01k 5/02
U.S. Cl. 204—181                                    26 Claims

ABSTRACT OF THE DISCLOSURE

A method of producing luminescent surfaces such as those used in cathode ray tubes and fluorescent lights in which the luminescent material is electrophoretically deposited over a thin film of metallic aluminum which has been applied to one surface of a transparent substrate. The opaque metallic aluminum film is then converted into transparent aluminum oxide which bonds the luminescent material to the transparent substrate.

BACKGROUND OF THE INVENTION

(I) Field of the invention

There are ever increasing demands for more and better cathode ray tubes, fluorescent lights, and other luminescent display devices which use a luminescent surface. This invention is concerned with a new method of applying and bonding luminescent materials to transparent substrates in the production of such surfaces. The term "luminescent screen" or simply "screen" will be used hereinafter in referring to luminescent surfaces produced from a transparent substrate on which a luminescent material has been deposited.

Electrophoretic processes, such as that described in the Nicholas F. Cerulli U.S. Pat. No. 2,851,408, are economical, simple, fast and generally produce screens with exceptionally high resolution qualities. Nevertheless, such processes are in very limited use due to many problems hereinafter described. Consequently, industry presently uses the "settled screen" process almost exclusively in the manufacture of cathode ray tubes and other luminescent surfaces.

(II) Description of the prior art

Producing luminescent surfaces by an electrophoretic process requires the surface, that is to be covered by luminescent material, to act as an electrode in an electrical circuit. There are at present two approaches by which the desired surface of transparent substrate can be made electroconductive. The first is to apply a thin, transparent, electrically conductive layer on one surface of the transparent substrate. This transparent conductive layer acts as an electrode which attracts, by electrophoretic action, luminescent particles suspended in an electrolyte. Finding transparent, electrically conductive materials that can be applied as smooth thin films has been the most serious problem area in producing good electrophoretic screens. Two of the most successful materials used are tin-oxide, and an ultra thin film of metallic gold over bismuth oxide. However, even the results obtained by using these materials are not satisfactory. Experience has shown that thin transparent layers of tin oxide do not always have uniform electrical conductivity throughout, and that areas of high conductivity attract heavier layers of luminescent material than areas of low conductivity. This irregular deposition of luminescent material results in a screen with irregular light intensity. In addition, transmission of visible light through the conductive coating is limited to 90% and ultraviolet light is limited to considerably less (approximately 70%). Luminescent material electrophoretically deposited over a film of metallic gold and bismuth oxide produces an excellent regular fine-grain luminescent layer. However, visible light transmission through the metallic gold and bismuth-oxide film is only 75%. Inability to transmit sufficient light through the transparent substrate and the conductive film is the primary objection to screens produced by either of these two electrophoretic processes. The 75% visible light transmission level of metallic gold and bismuth-oxide film is totally unacceptable for most commercial use. The 90% visible light transmission level achieved by screens using tin-oxide would probably be acceptable if there were no other defects. However, the marginal 90% transmission level along with irregular light intensity results in an unacceptable screen. For ultraviolet emitting phosphor the 70% transmision level of a tin oxide layer is also unacceptable.

The second approach is to deposit, by vacuum evaporation, a zinc film onto a transparent substrate, electrophoretically deposit the luminescent material on top of the zinc, and then evaporate the zinc from between the substrate and the luminescent material by baking the screen in a vacuum. Light transmission of a screen produced by this method is excellent if no zinc residue is left on the substrate. However, satisfactorily removing all of the zinc is very difficult, requires several vacuum operations, and often results in discoloration of the luminescent material. In addition, vacuum evaporated zinc often behaves in an erratic and unpredictable manner, and may form an irregular pitted zinc coating on the substrate. Electrophoretically depositing luminescent material over such a pitted conductive coating results in a non-uniform luminescent layer which may contain air pockets between the substrate and the luminescent material, as well as tiny areas around the pits in the zinc coating that are void of luminescent material. Erratic results and the expensive vacuum operations are the major disadvantages of this process.

Another problem that is common to both the electrophoretic process and the conventional "settled screen" process is controlling the particle size of the luminescent material. The most commonly used method of controlling the particle size is to "ball-mill" the material before it is used. This type of milling takes between 300 and 700 hours, and is often destructive to the luminescent efficiency of the material.

SUMMARY OF THE INVENTION

It is an object of this invention to provide a method for economically producing luminescent screens which overcome the heretofore noted disadvantages of the present electrophoretic methods.

Another object of the present invention is to provide a faster and simpler method of producing luminescent screens.

Still another object of the present invention is to provide a method of producing luminescent screens that transmit light with negligible losses.

A further object of the present invention is to provide a method of producing luminescent screens which have excellent resolution qualities.

Still a further object of the present invention is to provide a method of producing luminescent screens that have a strong interface bond between the luminescent material and the substrate.

Briefly, according to this invention a luminescent material is electrophoretically deposited on a cathode. The cathode comprises a thin, substantially opaque, continuous electrically conductive aluminum film which has been applied onto a transparent substrate. After a layer of luminescent material of the desired thickness has been deposited over the aluminum film, the electrolyte used for the electrophoretic deposition is leached out of the screen. The screen is then baked to evaporate the leaching solution. In addition to evaporating the leaching solution, baking also converts some or all of the metallic aluminum to transparent aluminum oxide, $Al_2O_3$. Any part of the aluminum film that cannot be converted by baking is converted by washing the screen in a potassium hydroxide or sodium hydroxide bath. After the opaque metallic aluminum has been converted to transparent aluminum oxide the screen can be subjected to several final process steps if desired. These steps include, protecting the luminescent material by applying a binder of potassium silicate mixed with deionized water, or adding a reflective coat of aluminum to the surface of the luminescent layer.

These together with other objects, features and advantages of the present invention will become apparent to those skilled in the art from the following detailed description and the attached drawing.

BRIEF DESCRIPTION OF THE DRAWING

The single figure shows an oblique partially cross-sectioned view of an aluminum electrode on a suitable substrate upon which electrode is deposited a layer of luminescent material in accordance with the method of the present invention.

DETAILED DESCRIPTION OF THE INVENTION

Referring to the drawing there is shown a luminescent screen 10 consisting of a transparent substrate 12 such as glass, upon which has been deposited a thin continuous electrically conductive aluminum film 14 and a layer 16 of luminescent material. The substrate 12 is cleaned as thoroughly as possible by methods that will not leave the substrate surface contaminated by the cleaning solution. Such methods include but are not limited to the following: (1) Washing the substrate in each of the following solutions and in the order as listed: trichloroethylene, acetone, ethyl alcohol, and deionized water; (2) washing the the substrate in a 5% ammonium bifluoride-95% deionized water solution, followed by a thorough flushing in deionized water, and then boiling the substrate in ethyl alcohol, and finally drying the substrate in the vapors of boiling alcohol; or (3) cleaning the substrate by the glow discharge process. To clean by this process the substrate is placed in a vacuum chamber, and the chamber pressure is reduced to approximately $10^{-1}$ mm. of Hg at which pressure the remaining air in the chamber is ionized by applying approximately 15 kv. potential across a pair of electrodes within the chamber. The ionization voltage is maintained while the chamber pressure is held between $10^{-1}$ mm. of Hg and $2.5 \times 10^{-2}$ mm. of Hg. The parameters of the glow discharge cleaning process set out above may be varied, however, the substrate may not be cleaned as effectively.

After the substrate has been cleaned, a thin film 14 of continuous electrically conductive aluminum is applied to the substrate by methods including but not limited to radio frequency sputtering, electron beam deposition or vacuum evaporation. A particularly satisfactory method of applying metallic aluminum for this invention is the following vacuum evaporation method. The substrate is placed in a vacuum chamber, and the chamber pressure is reduced to a pressure of approximately $2 \times 10^{-6}$ mm. of Hg at which point the metallic aluminum film is deposited on the substrate by heating a source of aluminum within the vacuum chamber until the aluminum evaporates. As the aluminum evaporates it is deposited on the substrate which has been placed in close proximity to the aluminum source. The aluminum may be deposited to any thickness desired, but a thickness ranging between 20 A.–300 A. seems to be particularly suitable for this invention. Below this thickness range, the film 14 may be in low electrical conductivity such that difficulty may be had in electrophoretically forming a luminescent coating thereon. Above 300 A. in thickness the film 14 may be unnecessarily thick resulting in less than the optimum obtainable transparency when converted to aluminum oxide.

After an aluminum film of sufficient thickness has been deposited on the substrate, a luminescent material is deposited on top of the aluminum film by the electrophoretic process. Luminescent materials suitable for use in this invention include but are not limited to such phosphors as silver silicate, copper silicate, zinc silicate and barium silicate. The electrolyte solution for this process is composed of between 6% to 1% deionized water with a corresponding 94% to 99% ethyl alcohol into which is well blended particles of the luminescent material and an alcohol-water soluble salt such as thorium nitrate, zinc nitrate, aluminum nitrate, nickel nitrate, or manganese nitrate. The percentages given are by weight. The amount of deionized water is limited to a maximum of 6% since, if larger percentages are used the luminescent material coagulates and precipitates out of the solution. There is no specific amount of alcohol-water soluble salt or luminescent material that must be added to the solution. However, better overall results are obtained if not more than 1 gram of alcohol-water soluble salt per liter of alcohol-water solution or 5 grams of luminescent material per liter of alcohol-water is used.

Referring again to the drawing, the transparent substrate 12 coated with an aluminum film 14 is then connected in a DC circuit as a cathode, and is submerged in the electrolyte solution along with a chemically inert anode such as nickel. A DC voltage is applied and maintained across the electrodes at a sufficient level to maintain the electrophoretic deposition current. Although a specific DC current, deposition time, or electrode spacing is not required, better results appear to be obtained if the parameters are selected so that the electrophoretic deposition rate can be maintained between 2 and 25 microns of luminescent material per minute. Thickness of the luminescent material 16 can be varied as desired depending on the future use of the screen. Since the particle size of the luminescent material must be uniform if the luminescent layer is to be smooth and regular, there are two methods of controlling said particle size. The first is the "ball-milling" method most commonly used for present electrophoretic deposition and "settled screen" processes. This method is satisfactory, but somewhat expensive and time consuming. The second, and the preferred method for this invention, is the elutriation process. That is, after the luminescent material particles and alcohol water soluble salt are well mixed with the alcohol-deionized water solution, the mixture is allowed to settle for a short period of time. During this time the larger and heavier luminescent material particles settle to the bottom of the solution. This leaves the smaller particles in the top portion of the solution. This top portion of the solution is then siphoned off to be used in the electrophoretic deposition process.

After the luminescent material has been deposited to the desired thickness, the screen is thoroughly washed in ethyl alcohol to leach out all traces of the electrolyte solution. The screen is then baked to remove the ethyl alcohol and to convert the aluminum film to transparent aluminum oxide, $Al_2O_3$. Baking, however, is not very effective for completely converting aluminum films that are over 100 A. in depth. Screens with aluminum films greater than 100 A. are preferably soaked in a solution of 1–5% potassium hydroxide or sodium hydroxide and a corresponding 99–95% deionized water after the first baking. This soaking converts the aluminum film that remains on the screen after the first baking to $Al_2O_3$. Any residue of potassium hydroxide or sodium hydroxide is then removed by a thorough washing with deionized water followed by a second baking of the screen. After the screen has cooled down from the second baking, the luminescent layer may be protected by applying a binder over the surface. One particularly suitable binder is potassium silicate and deionized water. The screen is then baked for a third time to set the binder. After cooling from the third baking, a lacquer may be applied over the luminescent layer to form a base for a reflecting aluminum surface which may then be applied by vacuum evaporation. A final baking in air removes the organic residue of the lacquer.

Screens produced by the method of this invention have a fine-grain, uniform luminescent layer, and the transparent substrate-aluminum oxide film combination have a light transmission level of approximately 98%. This 98% transmission level equals or exceeds the transmission levels of the best screens produced by the commonly used "settled screen" process. In addition, screens produced by the method of this invention retain all of the advantages of previous electrophoretic processes; that is, a high resolution screen produced by an economical, simple and fast process. The excellent light transmission quality of screens produced by this invention is illustrated in test results of two samples set out in Table I. Table I illustrates the percentage transmission level of the two samples at various wavelengths of light.

TABLE I

| Light wavelength | Transmission level in percentages | |
|---|---|---|
| | Sample 1 | Sample 2 |
| 322 mc | 99.2 | 98.3 |
| 338 mc | 97.8 | 97.2 |
| 354 mc | 98.7 | 97.2 |
| 372 mc | 99.2 | 99.2 |
| 386 mc | 97.5 | 98.2 |

A specific example of luminescent screen produced by the practice of this invention follows. To remove any surface contaminates, a 5" x 6" glass substrate was thoroughly washed in each of the following solutions and in the order as listed: trichloroethylene, acetone, ethyl alcohol, and deionized water. After drying, the substrate was then placed in a vacuum chamber where it was subjected to a final cleaning before the aluminum electrode was deposited. This final cleaning was accomplished by the "glow discharge" process at pressures between $10^{-1}$ mm. of Hg and $2.5 \times 10^{-2}$ mm. of Hg and a potential of 15 kv.

The aluminum film was deposited on the substrate by the vacuum evaporation process after the chamber pressure was further reduced to $2 \times 10^{-6}$ mm. of Hg. At this point voltage was applied across a tungsten filament to heat a piece of aluminum wire, 40 mm. by 0.040 mm. in diameter, which had been wrapped around the filament. Voltage was maintained on the filament until approximately 200 A. film of aluminum had been deposited on the substrate.

The substrate was then removed from the vacuum chamber and zinc silicate phosphor was deposited on top of the aluminum film by the electrophoretic process. The electrolyte solution used during the electrophoretic process consisted of approximately 98% ethyl alcohol and 2% deionized water to which was added 500 mg. of thorium nitrate ($Th(NO_3)_4$), per liter of alcohol and water and 2.4 grams of zinc silicate phosphor per liter of alcohol and water. This combination was then blended until the zinc silicate was in solution; approximately 15 minutes. The solution was then allowed to elutriate for one hour after which time the top one-third portion of the solution was siphoned off. This siphoned off portion of the electrolyte contained zinc silicate with a particle size that averaged between 3 and 5 microns. The aluminum film on the substrate was then connected as a cathode with said aluminum surface of the substrate facing a nickel anode at a distance of approximately 1 cm. Both electrodes were then submerged in electrolyte solution, and 20 volts DC was applied across the cathode and anode. Zinc silicate suspended in the solution was thereby deposited on the aluminum surface of the cathode by the electrophoretic process. Deposition of the zinc silicate was continued until a 12 to 13 micron thickness was reached; this took approximately two minut⁺

Thorium nitrate electrolyte in the screen was then leached out by washing in ethyl alcohol for approximately five minutes. The screen was then baked at approximately 400° C. for one hour to remove any remaining alcohol. This baking also converted some of the aluminum to aluminum oxide, $Al_2O_3$. The remaining metallic aluminum electrode under the zinc silicate was converted to tranparent $Al_2O_3$ by soaking the screen in a solution of approximately 99% deionized water and 1% potassium hydroxide. The potassium hydroxide was then leached out by soaking in 100% deionized water. The water and any remaining traces of potassium hydroxide were removed by a second baking of the substrate at 400° C. for one hour. After the screen had cooled, a binder consisting of approximately 7.5% potassium silicate and 92.5% deionized water was sprayed onto the screen. The screen was again baked at 400° C. for one hour to set the binder, remove any impurities, and convert any remaining traces of aluminum into $Al_2O_3$. After cooling, the substrate was submerged in deionized water with the zinc silicate side up. Lacquer was added to the water and formed a film over the surface of said water. The water was then slowly drained away until the film of lacquer draped over the substrate. The film of lacquer so applied was approximately 1-2 microns thick. After the lacquer had dried on the substrate, a reflecting coat of aluminum between 2000 A. and 3000 A. was deposited over the lacquer by vacuum evaporation. The substrate was then given a final air baking at 115° C. for fifteen minutes to remove all traces of the lacquer.

Although the present invention has been described with respect to specific methods of production, it is not intended that such specific references be limitations on the scope of the invention except insofar as set forth in the following claims.

I claim:
1. A method of producing a luminescent screen comprising the steps of:
   providing a transparent substrate,
   applying a film of metallic aluminum having a thickness up to about 300 A. on one side of said transparent substrate,
   electrophoretically depositing a layer of luminescent material on top of the aluminum film, and thereafter converting metallic aluminum to transparent aluminum oxide.
2. The method of claim 1 wherein the transparent substrate is glass.
3. The method of claim 1 further comprising the step of cleaning the transparent substrate before the film of metallic aluminum is applied.
4. The method of claim 3 wherein the step of cleaning comprises separately washing said substrate in solutions of trichloroethylene, acetone, ethyl alcohol, and 100% deionized water, in the order named.
5. The method of claim 3 wherein the step of cleaning comprises:
   washing the substrate in a solution of 90-98% deionized water and 10-2% ammonium bifluoride, then washing the substrate in 100% deionized water, then boiling the substrate in ethyl alcohol, and thereafter drying the substrate in alcohol vapors.
6. The method of claim 3 wherein the step of cleaning comprises exposing said substrate to an ionized gas at subatmospheric pressure.
7. The method of claim 1 wherein the film of metallic aluminum is deposited on the transparent substrate by vacuum evaporation.
8. The method of claim 1 wherein the film of metallic aluminum is deposited on the transparent substrate by radio frequency sputtering.

9. The method of claim 1 wherein the film of metallic aluminum is deposited on the transparent substrate by electron beam deposition.

10. The method of claim 1 wherein the aluminum is converted to aluminum oxide by baking.

11. The method of claim 1 wherein the aluminum is converted to aluminum oxide by soaking the screen in a solution of potassium hydroxide and deionized water.

12. The method of claim 1 wherein the aluminum is converted to aluminum oxide by soaking the screen in a solution of sodium hydroxide and deionized water.

13. The method of claim 1 wherein the transparent substrate is glass, and further steps comprise cleaning said glass substrate, and coating said luminescent material with a binder solution.

14. The method of claim 13 wherein the step of cleaning comprises separately washing said substrate in solutions of trichloroethylene, acetone, ethyl alcohol and 100% deionized water in the order named, and thereafter exposing said substrate to an ionized gas at subatmospheric pressure.

15. The method of claim 13 wherein the step of converting the metallic aluminum to aluminum oxide comprises baking the substrate at approximately 400° C. for approximately one hour.

16. The method of claim 13 wherein the step of converting the metallic aluminum to aluminum oxide comprises soaking the screen in a solution of 90–99% deionized water and 10–1% potassium hydroxide.

17. The method of claim 13 wherein the step of converting the metallic aluminum to aluminum oxide comprises soaking the screen in a solution of 90–99% deionized water and 10–1% sodium hydroxide.

18. The method of claim 13 wherein said luminescent material is deposited to a thickness of from 12 to 13 microns.

19. The method of claim 13 wherein said metallic aluminum is deposited to a thickness of no less than about 20 A.

20. The method of claim 13 further comprising the step of applying an aluminum reflecting coating over the surface of the luminescent material layer.

21. The method of claim 13 wherein said binder material consists of between 90–98% deionized water and 10–2% potassium silicate.

22. The method of claim 13 wherein said luminescent material is a phosphor selected from the group consisting of silver silicate, copper silicate, zinc silicate and barium silicate.

23. The method of claim 13 further comprising the step of preparing an electrolyte consisting essentially of an alcohol and deionized water solution to which is added particulate luminescent material and an alcohol-water soluble salt selected from the group consisting of thorium nitrate, zinc nitrate, aluminum nitrate, nickel nitrate, and manganese nitrate.

24. The method of claim 23 further comprising the step of elutriating the electrolyte solution to obtain a more uniform particle size of said luminescent material.

25. A method of producing a luminescent screen comprising the steps of:
providing a glass substrate,
separately washing said substrate in solutions of trichloroethylene, acetone, ethyl alcohol, and 100% deionized water in the order named, and thereafter exposing said substrate to an ionized gas at subatmospheric pressure,
depositing a film of metallic aluminum on one surface of said glass substrate to a thickness of from 20 A. to 300 A.,
electrophoretically depositing a layer of phosphor selected from the group consisting of silver silicate, copper silicate, zinc silicate and barium silicate to a thickness of from 12 to 13 microns,
converting the metallic aluminum to aluminum oxide by baking the substrate at approximately 400° C. for approximately one hour, and then
further converting any remaining metallic aluminum to aluminum oxide by soaking the screen in a solution of 90–99% deionized water and 10–1% of a material selected from the group consisting of potassium hydroxide and sodium hydroxide,
coating said phosphor with a binder material which consists of between 90–98% deionized water and 10–2% potassium silicate, and
applying an aluminum reflecting coat over the surface of the luminescent material and binder.

26. A luminescent screen produced by the method of claim 1.

References Cited

UNITED STATES PATENTS

| 3,314,871 | 4/1967 | Hecks et al. | 204—181 |
| 3,360,450 | 12/1967 | Hays | 204—181 |
| 3,554,889 | 1/1971 | Hyman et al. | 204—181 |

FOREIGN PATENTS

| 1,101,664 | 1/1968 | Great Britain | 204—181 |

HOWARD S. WILLIAMS, Primary Examiner

PO-1050
(5/69)

UNITED STATES PATENT OFFICE
CERTIFICATE OF CORRECTION

Patent No. 3,681,222        Dated  August 1, 1972

Inventor(s) James A. Gupton, Jr.

It is certified that error appears in the above-identified patent and that said Letters Patent are hereby corrected as shown below:

Column 3, line 42, delete "the" (first occurrence)

Column 5, Table I, lines 30-34, "mc" should be -- m$\mu$ --; line 37, " 6" " should be -- 7" --.

Signed and sealed this 9th day of January 1973.

(SEAL)
Attest:

EDWARD M. FLETCHER, JR.
Attesting Officer

ROBERT GOTTSCHALK
Commissioner of Patents